United States Patent [19]
Lohr et al.

[11] Patent Number: 5,631,542
[45] Date of Patent: May 20, 1997

[54] METHOD FOR CONTROLLING THE STRENGTH OF A CHARGING CURRENT

[75] Inventors: Guenter Lohr; Peter Wolf, both of Leinfelden-Echterdingen; Alexander Osswald, Stuttgart, all of Germany

[73] Assignee: Robert Bosch GmbH, Stuttgart, Germany

[21] Appl. No.: 484,086

[22] Filed: Jun. 7, 1995

[30] Foreign Application Priority Data

Jun. 16, 1994 [DE] Germany .......................... 44 20 957.6

[51] Int. Cl.$^6$ .............................................. H01M 10/44
[52] U.S. Cl. .............................................................. 320/49
[58] Field of Search ........................... 320/49, 57, DIG. 2, 320/32; 323/237, 266, 268, 300; 363/85, 86, 54

[56] References Cited

U.S. PATENT DOCUMENTS

| | | | |
|---|---|---|---|
| 3,590,358 | 6/1971 | Ruben | 320/39 |
| 3,969,665 | 7/1976 | Rowas | 320/DIG. 2 X |
| 3,987,354 | 10/1976 | Mason | 320/DIG. 2 X |
| 4,163,934 | 8/1979 | Lawn | 320/32 X |
| 5,089,765 | 2/1992 | Yamaguchi | |
| 5,214,369 | 5/1993 | McCrea | 320/DIG. 2 X |
| 5,410,238 | 4/1995 | Ishizuka et al. | 320/22 |

FOREIGN PATENT DOCUMENTS

| | | |
|---|---|---|
| 0288213A2 | 10/1988 | European Pat. Off. . |
| 4110453A1 | 10/1991 | Germany . |
| 1245825 | 9/1971 | United Kingdom . |

*Primary Examiner*—Peter S. Wong
*Assistant Examiner*—Patrick B. Law
*Attorney, Agent, or Firm*—Kenyon & Kenyon

[57] ABSTRACT

In a method for controlling the strength of a charging current when charging a battery by means of an alternating voltage source, the rectified voltage of the alternating voltage source is fed to the battery via a phase control circuit with variable triggering angle. The battery voltage is measured and the value of the triggering angle to be set is identified as a function of the measured battery voltage and the voltage of the alternating voltage source.

10 Claims, 2 Drawing Sheets

1

METHOD FOR CONTROLLING THE STRENGTH OF A CHARGING CURRENT

BACKGROUND INFORMATION

German Patent Application No. DE 41 10 453 A1 describes a charger in which the voltage of the secondary battery to be charged is measured and used to control the charging current. This method serves to stop the charging process when the voltage of the secondary battery begins to drop from its peak value, which is interpreted as a sign of a sufficiently charged secondary battery.

Furthermore, European Patent Application No. EP 0 288 213 A1 describes a device for charging a battery, which device serves to control the charging current as a function of the state of charge or discharge of a battery. A control logic which is connected to a current sensor in order to detect the charging current serves this purpose. Usually, a shunt resistor is used for the current sensor, the signal which is tapped off at this resistor then being amplified by means of an operational amplifier.

SUMMARY OF THE INVENTION

The method according to the present invention has the advantage that the charging current is controlled without a shunt resistor and also without an operational amplifier in that the values of the battery voltage and the voltage of the alternating voltage source are used to control the strength of the charging current. As a result of this, electrical energy is also prevented from being converted into heat at a shunt resistor, as a result of which the degree of efficiency of a charger can be increased with this method. It is a further advantage that not only the battery voltage but also the voltage of the alternating voltage source is used to control the strength of the charging current, as a result of which increased accuracy and increased efficiency of the charger which is operated with this method are achieved.

Measuring the peak value of the voltage of the alternating voltage source provides the advantage that instead of a voltage value which is permanently set in the charger and only estimates the actual peak value, the actual peak value which represents reality is used as a basis for the control, as a result of which increased accuracy of the control is obtained.

It is also advantageous if the voltage of the alternating voltage source is sampled, and thus a plurality of amplitude values are acquired, since in this way even more accurate detection of the actual voltage characteristic of the voltage of the alternating voltage source is carried out. The effect of this detection on the control is to increase accuracy.

The assignment, using a table, of the triggering angle value to be set gives rise to the advantage that a costly circuit is not necessary to identify, for example with an algorithm realized by circuitry, the triggering angle value to be set. In addition, any desired, in particular even nonlinear, assignments between voltages and the triggering angle value to be set can be realized particularly simply in this way.

The arrangement of the table as part of an assignment means having a memory serves as an advantageous embodiment since it is thus not necessary to provide a complicated circuit to realize the table and, in addition, changes to the contents of the table can be made particularly easily.

Integration of the amplitude values, acquired by sampling, of the voltage of the alternating voltage source over a time interval provides the advantage of further increasing the accuracy of the control since the integral which is determined in this way constitutes an extremely accurate value which is representative of the charging current actually flowing.

If the phase control circuit is not triggered for a half period of the voltage of the alternating voltage source, the advantage is obtained that the voltage of the alternating voltage source can be measured in a virtually unloaded state, as a result of which an influence of a load which falsifies the measurement result is reduced. The same advantage also applies here to measurement of the accumulator voltage which in the nonfired state of the phase control circuit is not loaded by the alternating voltage source either and thus can be measured more accurately.

If the charging current is kept approximately constant, a direct assignment between the capacity of the battery and the charging time is thus advantageously possible for the user of the charger utilizing the method. Furthermore, a constant current can be dimensioned in such a way that there is optimum, maximum utilization of a charger up to the load capability of the transformer contained therein without causing damage to the charger. A further advantage which occurs is that, as a result of keeping the charging current constant, the measurement of the battery voltage can take place more accurately, in particular in order to control the actual charging process itself.

The change in the triggering angle value to be set as a function of the amplitude of the voltage of the alternating voltage source in such a way that a reduction in the amplitude of the voltage of the alternating voltage source brings about a reduction in the triggering angle value to be set provides the advantage that the transformer which is used to transform the voltage of the alternating voltage source can be operated with a higher capacity utilization in that a higher average value of the strength of the charging current is set with an approximately constant effective value of the strength of the charging current. As a result, the charging times are shortened.

Likewise, it proves advantageous to set the triggering angle value to be set in such a way that, when the difference between the measured battery voltage and the peak value of the voltage of the alternating voltage source is reduced, the triggering angle value to be set is reduced since, with an approximately constant effective value of the strength of the charging current, the average strength of the charging current can thus be increased with a higher battery voltage or a low voltage of the alternating voltage source, which also brings about a shortening of the charging time.

DETAILED DESCRIPTION

Figure 1:
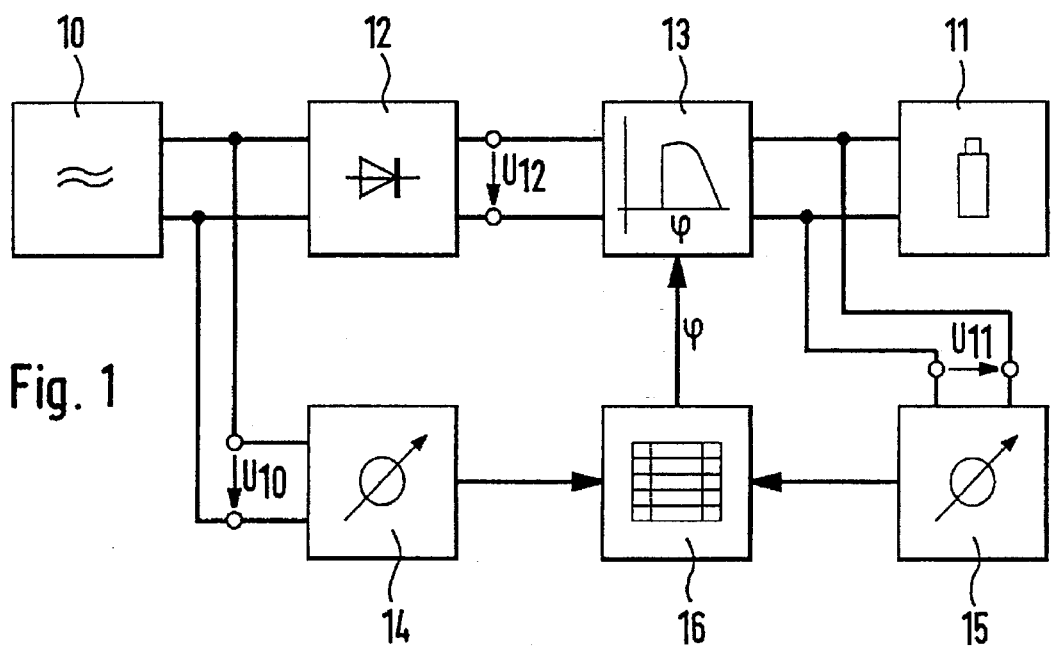
FIG. 1 shows a block circuit diagram of a charging circuit according to the present invention.

In the block circuit diagram illustrated in FIG. 1, an alternating voltage source 10 is connected upstream of a rectifier 12 and a voltage measuring device 14. The outputs of the rectifier 12 are connected to inputs of a phase control circuit 13 whose outputs are in turn connected, on the one hand, to a battery 11 and, on the other hand, to a further voltage measuring device 15. The two voltage measuring devices 14, 15 each have an output which is connected to an assignment means 16. The only output of the assignment means 16 is connected to an input of the phase control circuit 13.

The alternating voltage supplied by the alternating voltage source 10 is converted into a rectifier voltage $U_{12}$ by means of the rectifier 12. The rectifier voltage $U_{12}$ serves as an input signal for the phase control circuit 13. The phase control circuit 13 has switching means which only permit the rectifier voltage $U_{12}$ to pass above a triggering angle $\phi$. A voltage with a cut-in phase is thus present at the output of the phase control circuit 13. This voltage is loaded with the battery 11. The battery 11 has a direct voltage in the form of a battery voltage $U_{11}$.

By means of the voltage measuring device 14, the voltage is measured at the input of the rectifier 12. Likewise, the battery voltage $U_{11}$ is measured by means of the further voltage measuring device 15. The measurement results for the voltage values are passed from the voltage measuring devices 14, 15 to the assignment means 16 which contains a table. In the table, values for the triggering angle $\phi$ to be set which correspond to different possible value combinations for the voltage values are stored. Thus, an assignment of the measured voltage values to a value of the triggering angle $\phi$ to be set takes place in the assignment means 16 for each comparison of the actually measured voltage values with the contents of the table.

The value of the triggering angle $\phi$ to be set which is identified in this way is fed as information from the assignment means 16 to the phase control circuit 13, after which the latter brings about a phase control with the corresponding value of the triggering angle $\phi$ to be set. By means of the phase control, the output voltage of the phase control circuit 13 is varied in terms of its voltage/time area. Thus, the charging current which is proportional to this voltage/time area varies in terms of its strength. The larger the value set for the triggering angle $\phi$, the smaller the resulting current strength of the charging current. By appropriately dimensioning the values of the triggering angle $\phi$ stored in the table for various combinations of measured values for the voltages $U_{10}$, $U_{11}$ measured by the measuring devices 14, 15, the strength of the charging current can thus be set under different conditions to any desired prescribed values.

It is, for example, customary to keep the strength of the charging current constant because, on the one hand, this produces a constant capacity utilization of the transformer usually contained in the alternating voltage source 10 and, on the other hand, it becomes possible for the user of such a charging circuit to calculate in advance the charging time in a simple way.

Figure 2:
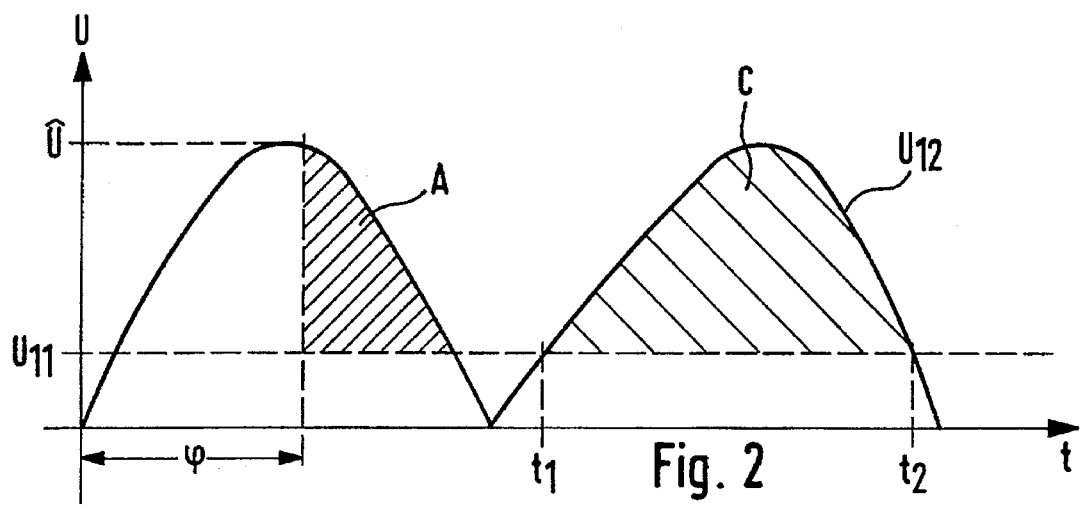
FIG. 2 shows the voltage characteristic of the voltage downstream of the rectifier with thyristors that have not been triggered.

FIG. 2 is a diagram which illustrates the characteristic of the rectifier voltage $U_{12}$ for a time excerpt which is selected by way of example. The rectifier voltage $U_{12}$ constitutes a rectified sinusoidal signal. Furthermore, the battery voltage $U_{11}$ which is to be considered approximately as a constant voltage for this short time excerpt is shown. A charging process with a charging current which flows from the alternating voltage source 10 to the battery 11 can only come about if the rectifier voltage $U_{12}$ exceeds the battery voltage $U_{11}$. Therefore, a charging process takes place starting from a time $t_1$ when the rectifier voltage $U_{12}$ exceeds the battery voltage $U_{11}$ and up to a time $t_2$ when the rectifier voltage $U_{12}$ drops below the battery voltage $U_{11}$. This means that the time integral over the rectifier voltage $U_{12}$ in between these two times $t_1$, $t_2$ minus the integral over the accumulator voltage $U_{11}$ between these two times $t_1$, $t_2$ corresponds to the voltage which can be used to charge the battery 11. The voltage/time area which is representative of this case is labeled with the letter C.

Since the voltage at the input of the rectifier 12 is connected to the charging current via the internal resistor of the alternating voltage source 10 in a direct and approximately linear way, the strength of the charging current can be controlled by controlling the size of the voltage/time area C which is effective during the charging of the battery 11. This is on the condition that the alternating voltage source 10 has a finite ohmic internal resistance which is different from zero. Such a control takes place by means of the phase angle control of the phase control circuit 13. The effect of this is that only part of the voltage/time area C is used for charging the battery 11, which part lies in terms of timing after the set value of the triggering angle $\phi$ and before the time $t_2$ when the rectifier voltage $U_{12}$ drops below the battery voltage $U_{11}$. This area is labeled in FIG. 2 with the letter A.

The following three possibilities are involved, in principle:

1. In many cases it may be already adequate to use an ideal curve shape of the voltage of the alternating voltage source 10 as a basis. Thus, it is for example known that the mains voltage in Germany has a uniform effective value of 230 V and a uniform sinusoidal shape. Assuming that these data are always approximately constant, it is possible to identify by calculation which charging current for an ideal and constant sinusoidal curve shape of the mains voltage occurs at which value of the triggering angle $\phi$. Thus, for a prescribed voltage, such as here the sinusoidal voltage with effective value 230 V, a control of the strength of the charging current also can occur by way of the value of the triggering angle $\phi$ to be set. The value of the triggering angle $\phi$ to be set can then be identified by means of a table, by means of a permanently wired circuit or by using a suitable software program, these having as input variable the measured value exclusively of the further voltage measuring device 15 and as an output variable the value of the triggering angle $\phi$ to be set. The voltage measuring device 14 is not necessary for this variant.

2. In order to improve the accuracy of this method, it may be expedient to provide the voltage measuring device 14 which measures the peak value U of the voltage of the alternating voltage source 10. As a result, it is in particular possible to adapt the identification of the value of the triggering angle $\phi$ to be set to the actual peak value $\hat{U}$, i.e. the actual maximum amplitude of the voltage of the alternating voltage source 10. It is also known that it is possible for fluctuations to occur in a current network, which fluctuations depend on the loading of the network and result in different peak values $\hat{U}$. In the above-mentioned first case, the peak value $\hat{U}$ is only estimated. A worst case scenario, i.e., the maximum possible peak value $\hat{U}$ is used as fixed value for the identification of the value of the triggering angle $\phi$ to be set, must serve as a basis for the dimensioning of the charging current in order to prevent the charging circuit being damaged. In the second case mentioned here, it is possible to achieve a higher degree of capacity utilization of the charging circuit. The information supplied by the voltage measuring device 14 on the peak value $\hat{U}$ of the voltage of the alternating voltage source 10 then also serves as an input variable for the assignment means 16.

3. The detection not only of a measured value of the voltage $U_{10}$ of the alternating voltage source 10 but also of a large number of sampled values which simulate the curve shape of the voltage $U_{10}$ of the alternating voltage source 10 constitutes a further improvement of this method. The higher the density of the sampling points over the voltage $U_{10}$ of the alternating voltage source 10, the more accurate can the simulation of the curve shape be made and also the more accurate can be the identification of the voltage/time area A which is relevant for the charging current. In this case, the voltage measuring device 14 transmits a large number of sampling points as an input variable to the assignment means 16 where a corresponding evaluation takes place in order to determine the value of the triggering angle $\phi$ to be set. This evaluation takes place for example by means of a software program which performs an integration over time using the acquired sampled values and a calculation of the voltage/time area A taking into account the measured value of the battery voltage $U_{11}$ which is fed by the other voltage measuring device 15. As an alternative to the software program, there may also be provision here for a permanently wired circuit or a table in stored or permanently-wired form to be used again.

With this charging current control behavior it is in particular possible to charge the battery 11 with the alternating current source 10, the strength of the charging current remaining approximately constant. During the charging of the battery 11, the characteristic of the battery voltage $U_{11}$ can be used as information in order, in particular, to estimate the state of charge of the battery 11 and to set, for example, the limitation of the charging time using this as a basis.

It is known, for example, to terminate the charging process directly after a drop, measured during the charging process, in the battery voltage $U_{11}$. In order to detect this drop it is thus also necessary to measure the battery voltage $U_{11}$. By keeping the strength of the charging current constant a more precise measurement of the battery voltage $U_{11}$ is possible. The constancy of the charging current also serves, on the one hand, to permit the user of the charger to predict relatively accurately the required charging time by referring to the capacity of the battery 11 and serves, on the other hand, to load a transformer which is usually present in the alternating voltage source 10 with a constant current which brings about a constant loading of the transformer.

Endeavors are usually made to operate the transformer at the upper limit of its capacity. The capacity here is also limited by the losses in the transformer which are converted into warmth. The losses in the transformer consist here on the one hand of the demagnetization losses in the iron core and on the other hand of the heat losses in the windings. The losses in the windings are dependent here on the effective value of the strength of the flowing charging current. By identifying the maximum acceptable effective value of the strength of the charging current it is possible to determine the strength of the maximum charging current with which the accumulator 11 can be charged and thus also with which optimum charging should be performed. This value of the strength of the charging current can be converted by means of the internal resistor of the alternating voltage source 10 into a corresponding value of the voltage/time area A which should then be kept constant.

By repeated measurement of the battery voltage $U_{11}$ and of the voltage $U_{10}$ of the alternating voltage source, a deviation of the actual voltage/time area A from the desired voltage/time area A to be kept constant can be identified and appropriately corrected. The correction takes place here as a function of the following: if the battery voltage $U_{11}$ rises, the difference between the peak value Û and the battery voltage $U_{11}$ is reduced, as a result of which the value of the triggering angle $\phi$ to be set must be reduced in order to ensure a constant strength of the charging current.

This object of the correction is achieved by a software program or else by a permanently wired circuit. As an alternative to the software solution or to the permanently wired solution, a table solution may also be provided which indicates the corresponding value of the triggering angle $\phi$ to be set for each possible combination of output variables of the assignment means 16. In the assignment means 16, the table is only searched through until a specific combination of the input variables has been found, after which the associated value of the triggering angle $\phi$ to be set is communicated to the phase control circuit 13 by the assignment means 16.

Figure 3:
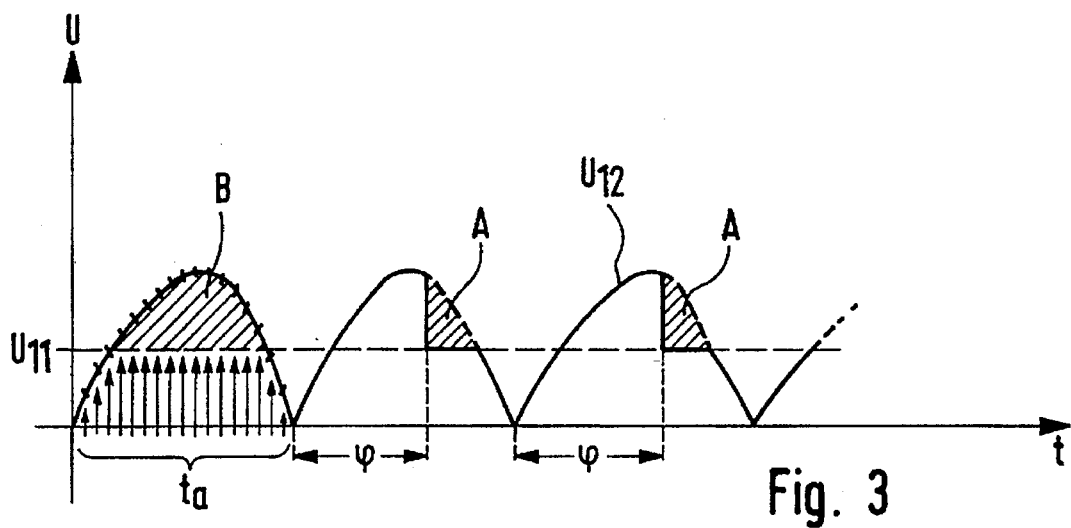
FIG. 3 shows the voltage characteristic downstream of the rectifier during the charging process.

In FIG. 3, a plurality of cycles of the rectifier voltage $U_{12}$ such as occur during the charging process are indicated. A fixed value for the strength of the charging current which is to be kept constant is prescribed. This value is stored in the assignment means 16 in any form and serves there as a basis for the behavior of the control of the strength of the charging current. Initially, a half wave of the rectifier voltage $U_{12}$ is used to sample the voltage of the alternating voltage source 10 while the phase control circuit 13 is not performing any triggering and thus no phase control. The assignment means 16 is equipped for this purpose with a circuit which prevents the triggering for a half wave. As a result of the fact that no phase control is carried out, the rectifier voltage $U_{12}$ can be measured in a state in which it is isolated from the battery 11 and thus not loaded by it.

The measured value is then passed from the voltage measuring device 14 to the assignment means 16. There, the voltage/time area B which corresponds to the voltage/time area A for the minimum triggering angle $\phi$ is identified. The calculation takes place here by means of the numerical integration using the sampled voltage amplitude values. Using the voltage/time area B calculated in this way, the value of the triggering angle $\phi$ to be set is identified in the assignment means 16 for the permanently wired circuit, software solution or table, which value of the triggering angle $\phi$ gives rise to the voltage/time area A corresponding to the prescribed strength of the charging current.

The identified value of the triggering angle $\phi$ to be set passes from the assignment means 16 to the phase control circuit 13. The subsequent half waves of the rectifier voltage 12 are then cut in their phase by the phase control circuit 13, as a result of which a conductive connection is produced between the battery 11 and the alternating voltage source 10 starting from the set value of the triggering angle $\phi$ and until the rectifier voltage 12 drops below the battery voltage 11, and the charging current flows. As a result of the low internal resistance of the battery 11, the rectifier voltage $U_{12}$ collapses to the value of the battery voltage $U_{11}$ directly after triggering begins at the set value of the triggering angle $\phi$. The rectifier voltage $U_{12}$, discounting the effect of an inductor in the alternating voltage source 10, does not vary again according to the voltage $U_{10}$ of the alternating voltage source 10 until the point at which the rectifier voltage $U_{12}$ drops below the battery voltage $U_{11}$.

In order to increase the accuracy of the method, the number of half waves, used for sampling, of the voltage $U_{10}$ of the alternating voltage source 10 can be increased. Sampling of one half wave per second proves expedient in order to be able to follow possible fluctuations in the curve shape of the voltage $U_{10}$ of the alternating voltage source 10. The measurement of the battery voltage $U_{11}$ should also take place in the unloaded state of the battery 11 for which the period before the triggering of the phase control circuit 13 is suitable since in this period there is no current-conducting connection between the battery 11 and the alternating voltage source 10.

A corresponding actuation takes place here ideally via the assignment means 16 which then simultaneously prevents the phase control circuit 13 triggering and triggers the measurement processes. For this purpose, the assignment means 16 is expediently synchronized with the frequency of the voltage $U_{10}$ of the alternating voltage source 10 in order to be able to carry out these processes at the respective correct time.

Thus, by measuring, a value is acquired for the battery voltage $U_{11}$, and either by estimation or by measuring, one or more values are acquired for the voltage $U_{10}$ of the alternating voltage source 10, which values produce an actual value which characterizes the charging current which is actually flowing. A desired value which characterizes the prescribed strength of the charging current then serves, together with the actual value, for identifying the value to be set for that triggering angle $\phi$ from which the prescribed strength of the charging current results. The desired value is used here either as a basis during the creation of the table, stored in the software program, or taken into account in the form of a circuit component of the permanently wired circuit. A constant strength of the charging current can be achieved in that the difference between the desired value and the actual value is kept as low as possible, preferably at zero, by varying the value of the triggering angle $\phi$ to be set.

There are two further effects which exert an influence on the charging current and there is provision to take these influences into account during the control of the strength of the charging current. For this purpose, it is assumed that the alternating voltage source 10 has a transformer.

A further advantageous improvement is the provision of nonlinearity in the assignment of the value of the triggering angle $\phi$ to be set to the input variables of the assignment means 16. The nonlinearity results here from the fact that a reduction in the voltage $U_{10}$ of the alternating voltage source 10 brings about a reduction in the demagnetizing losses in the iron of the transformer core, as a result of which the reduced generation of heat is available as a reserve for increasing the strength of the charging current. Thus, when the voltage $U_{10}$ of the alternating voltage source 10 is reduced, the strength of the charging current can be increased, the voltage/time area A can be enlarged, and, thus, the triggering angle $\phi$ can be reduced.

A further nonlinearity can be taken into account since the difference between the peak value û of the voltage $U_{10}$ of the alternating voltage source 10 and the battery voltage $U_{11}$ constitutes a measure of the difference between the effective value and the average value of the strength of the charging current. For safety reasons, the entire charging circuit is usually configured in such a way that, for the maximum possible difference between the two voltage values at which the maximum effective value of the strength of the charging current also occurs, the strength of the charging current occurring in such a case serves as a standard value for the identification of the prescribed value for the voltage/time area A which is not to be exceeded and for the minimum value of the triggering angle $\phi$ to be set which is associated therewith. When there is a reduction in this voltage difference, in particular as a result of a battery 11 with a high number of cells, i.e. a high rated voltage, being charged, as a result of the fact that the effective value of the strength of the charging current drops with the voltage difference, the increased battery voltage $U_{11}$ permits a corresponding increase in the strength of the charging current to be provided without overloading the charging circuit. This increase in the strength of the charging current takes place in turn by reducing the value of the triggering angle $\phi$ to be set, and brings about a shortening in the charging time.

Both nonlinear effects can be taken into account during the identification of the value of the triggering angle Q to be set in that the values contained in the table are appropriately corrected, the permanently wired circuit is supplemented with corresponding circuit components or the software program is extended with corresponding routines.

Figure 4:
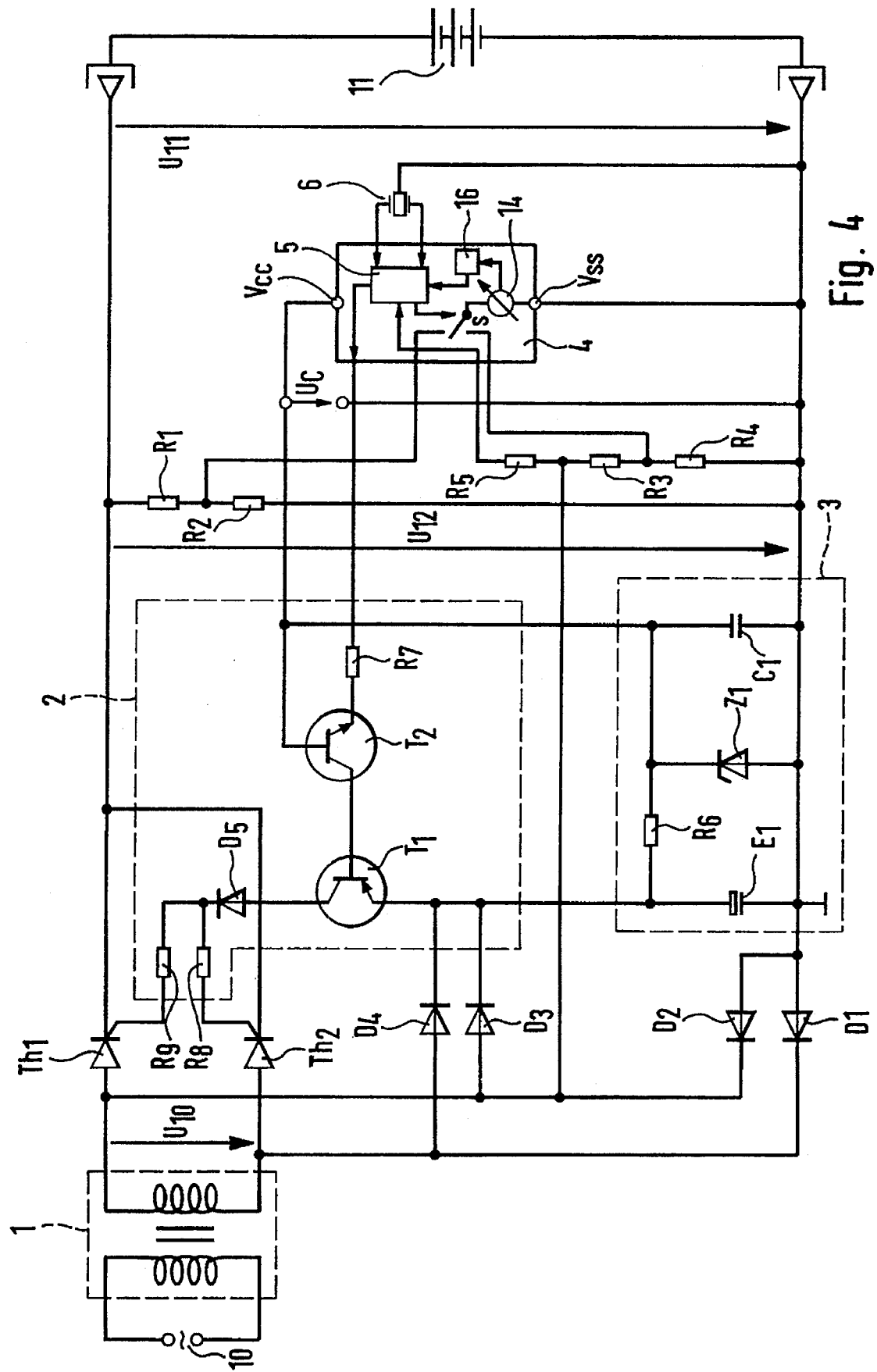
FIG. 4 shows a detailed circuit diagram of a charging circuit according to the present invention.

In FIG. 4 a circuit diagram is illustrated for a charging circuit. Identical numerals designate identical elements here in accordance with FIGS. 1 to 3. The alternating voltage source 10 has connected downstream of it a transformer 1 at whose secondary side the transformed voltage $U_{10}$ of the alternating voltage source 10 can be tapped off. A secondary-side terminal of the transformer 1 is connected to the anode of thyristor $Th_1$ and the cathode of a diode $D_2$. The other terminal on the secondary side of the transformer 1 is connected to the anode of a thyristor $Th_2$ and to the cathode of a diode $D_1$. The anodes of the diodes $D_1$, $D_2$ are connected to one another and to earth (ground). The cathodes of the two thyristors $Th_1$, $Th_2$ are also connected to one another and form a positive charging terminal for the battery 11. A negative charging terminal for the battery 11 is connected on the one hand to earth and on the other hand to an oscillating quartz 6. Further earth terminals are connected to the cathode of an electrolytic capacitor $E_1$, to the anode of a Zener diode $Z_1$, to a capacitor $C_1$, to a resistor $R_2$, to a resistor $R_4$, and to a negative supply voltage terminal of a microcontroller 4.

The control inputs of the thyristors $Th_1$ and $Th_2$ are connected to the cathode of a diode $D_5$ via one resistor $R_8$, $R_9$ each. The positive pole of the electrolytic capacitor $E_1$ is also connected to the emitter of a transistor $T_1$ whose collector is connected to the anode of the diode $D_5$. The emitter of the transistor $T_1$ is also connected via a diode $D_3$ to the anode of the thyristor $Th_1$ and via a diode $D_4$ to the anode of the thyristor $Th_2$ and also via a resistor $R_6$ to the cathode of the Zener diode $Z_1$ and to the second terminal of the capacitor $C_1$. The cathodes of the diodes $D_3$, $D_4$ are connected here to the emitter of the transistor $T_1$. The base of the transistor $T_1$ is connected to the collector of a transistor $T_2$ whose base is connected to a supply voltage $U_c$. Likewise, a positive supply voltage terminal $V_{cc}$ of the microcontroller 4 is connected to the supply voltage $U_c$. The emitter of the transistor $T_2$ is connected via a resistor $R_7$ to an output of the microcontroller 4.

The elements $R_8$, $R_9$, $D_5$, $T_1$, $T_2$, $R_7$ together form a level adaptation circuit 2. The elements $E_1$, $R_6$, $Z_1$, $C_1$ together form a voltage generator 3 which makes the supply voltage $U_c$ available at the cathode of the Zener diode $Z_1$. Between the positive charging terminal and the negative charging terminal a voltage divider is constructed in that a resistor $R_1$ is arranged between the positive charging terminal and the resistor $R_2$. The center tap between these two resistors $R_1$, $R_2$ is connected to the microcontroller 4. There is a further voltage divider between the anode of the thyristor $Th_1$ and the negative charging terminal in that a resistor $R_3$ is connected to the anode of the thyristor $Th_1$ and to the terminal of the resistor $R_4$ facing away from the negative charging terminal. The tap point between the resistors $R_3$ and $R_4$ is in turn connected to the microcontroller 4. A resistor $R_5$ whose other terminal is also connected to the microcontroller 4 is also connected to the anode of the thyristor $Th_1$.

The microcontroller 4 has the voltage measuring device 14 which measures the voltage between the negative charging terminal and a switch S arranged on the other side of the voltage measuring device 14, it being possible for the switch S to be connected selectively to the tap point between the resistors $R_1$ and $R_2$ or to the tap point between the resistors $R_3$ and $R_4$. The result of the measurement is fed from the voltage measuring device 14 to the assignment means 16 which is also part of the microcontroller 4. The assignment which takes place in the assignment means 16, whose design is not illustrated here in greater detail, gives rise to a value of the triggering angle $\phi$ to be set which is fed to a synchronization circuit 5 which is part of the microcontroller 5. The synchronization circuit 5 receives signals on the one hand from the oscillator 6 and on the other hand from the secondary side of the transformer 1 via the resistor $R_5$. The design of the synchronization circuit 5 is also not shown here in greater detail.

The synchronization circuit B brings about a synchronization of the changing over of the switch S and of the issuing of a triggering signal to the thyristors $Th_1$ and $Th_2$ with the frequency of the voltage $U_{10}$ of the alternating voltage source 10 via the level adaptation circuit 2 when the set value of the triggering angle z is reached. By means of the synchronized changing over of the switch S, a voltage which is proportional to the battery voltage $U_{11}$ and a voltage which is proportional to the voltage $U_{10}$ of the alternating voltage source 10 are measured alternately, the voltage being divided by means of one of the voltage dividers in each case. The voltage dividers are preferably of a design with very high impedance here so that only small losses occur at the voltage dividers.

Usually one value per measurement process is sufficient for measuring the battery voltage $U_{11}$ while for the measurement of the voltage $U_{10}$ of the alternating voltage source 10 a plurality of measured values in the form of a sampling are read into the assignment means 16. The assignment means 16 then performs the numerical integration and identifies the value of the triggering angle $\phi$ to be set, which value is passed to the synchronization circuit 5. When the set value of the triggering angle $\phi$ is reached, the synchronization circuit 5 outputs the triggering signal.

Since the output level of the microcontroller 4 is usually not adequate to supply the current required for triggering the thyristors $Th_1$, $Th_2$, the level adaptation circuit 2 is provided. The level adaptation circuit 2 serves here to provide a sufficiently large triggering current for the thyristors $Th_1$ and $Th_2$ as a function of the triggering signal which is output by the microcontroller 4 and is output at the time corresponding to the value of the set triggering angle $\phi$.

The voltage generator 3 serves to provide the approximately stabilized voltage supply Uc for the micro-controller 4 and the level adaptation circuit 2. In this circuit the rectifier 12 and the phase control circuit 13 are combined since at the same time as fulfilling their phase-controlling function the thyristors $Th_1$, $Th_2$ also have a rectifying effect.

There is also provision for the method for controlling the strength of the charging current to be practiced in the following way: after the amplitude values of the voltage $U_{10}$ of the alternating voltage source 10 are sampled with the thyristors $Th_1$, $Th_2$ not triggered and after measurement of the battery voltage $U_{11}$, a first integral over the voltage $U_{10}$ of the alternating voltage source 10 is calculated in numerical form in the assignment means 16 between the triggering time, i.e. the time when the set value of the triggering angle $\phi$ is reached, and the time $t_2$ when the voltage $U_{10}$ of the alternating voltage source 10 drops below the battery voltage $U_{11}$, a second integral over the battery voltage $U_{11}$ is calculated between the same two times and subtracted from the first integral, as a result of which an actual value for the voltage/time area A is obtained.

A desired value, stored in the assignment means 16, for the voltage/time area A is subsequently compared with the actual value in the assignment means 16. If there is a difference between the desired value and the actual value, the value of the triggering angle $\phi$ to be set is corrected in the direction which brings about a reduction in the difference. This process is repeated until the difference is virtually zero, i.e. the actual value has been approximated to the desired value.

There is therefore provision for the method according to the present invention to be repeated several times one after the other, preferably over the entire length of a charging process in order to keep the strength of the charging current continuously at a prescribed value. If fluctuations occur in the voltage $U_{10}$ of the alternating voltage source 10, this method thus permits the strength of the charging current to be adjusted to a constant value by varying the value of the triggering angle $\phi$ to be set.

What is claimed is:

1. A method for controlling a strength of a charging current when charging a battery via an alternating voltage source, comprising the steps of:

rectifying an alternating voltage of the alternating voltage source;

feeding the rectified voltage to the battery via a phase control circuit;

measuring a battery voltage of the battery; and setting a value of a triggering angle at the phase control circuit as a function of the alternating voltage and of the measured battery voltage, the triggering angle controlling the strength of the charging current, wherein the value of the triggering angle is set such that the strength of the charging current remains approximately constant.

2. A method for controlling a strength of a charging current when charging a battery via an alternating voltage source, comprising the steps of:

rectifying an alternating voltage of the alternating voltage source;

feeding the rectified voltage to the battery via a phase control circuit;

measuring a battery voltage of the battery;

setting a value of a triggering angle at the phase control circuit as a function of the alternating voltage and of the measured battery voltage, the triggering angle controlling the strength of the charging current; and acquiring, by sampling, a plurality of amplitude values of the alternating voltage, and wherein the value of the triggering angle is set as a further function of the amplitude values.

3. The method according to claim 2, wherein the value of the triggering angle is set by identifying the value through comparison of the alternating voltage and of the battery voltage to values contained in a table.

4. The method according to claim 3, wherein the values contained in the table are read out of a memory of an assignment unit.

5. The method according to claim 4, further comprising the step of integrating the amplitude values over a preselected time interval in the assignment unit, and wherein the value of the triggering angle is set as a further function of the integrated amplitude values.

6. A method for controlling a strength of a charging current when charging a battery via an alternating voltage source, comprising the steps of:

rectifying an alternating voltage of the alternating voltage source;

feeding the rectified voltage to the battery via a phase control circuit;

measuring a battery voltage of the battery;

setting a value of a triggering angle at the phase control circuit as a function of the alternating voltage and of the measured battery voltage, the triggering angle controlling the strength of the charging current; and measuring a peak value of the alternating voltage, and wherein the value of the triggering angle is set as a further function of the measured peak value.

7. The method according to claim 6, further comprising the step of reducing the value of the triggering angle such that an arithmetic average value of the strength of the charging current increases and an effective value of the strength of the charging current remains approximately constant, when a reduction in the peak value of the alternating voltage is measured.

8. The method according to claim 6, further comprising the steps of:

determining a difference between the measured battery voltage and the measured peak value of the alternating voltage; and when a reduction in the difference is detected, reducing the value of the triggering angle such that an arithmetic average value of the strength of the charging current increases and an effective value of the strength of the charging current remains approximately constant.

9. A method for controlling a strength of a charging current when charging a battery via an alternating voltage source, comprising the steps of:

rectifying an alternating voltage of the alternating voltage source using a rectifier;

feeding the rectified voltage to the battery via a phase control circuit, an input of the phase control circuit being coupled to the rectifier and an output of the phase control circuit being coupled to the battery;

measuring a battery voltage of the battery; and setting a value of a triggering angle at the phase control circuit as a function of the alternating voltage and of the measured battery voltage, the triggering angle controlling the strength of the charging current.

10. The method according to claim 9, further comprising the step of measuring the alternating voltage, the measuring step including not triggering the phase control circuit for a half period of the alternating voltage.

* * * * *

UNITED STATES PATENT AND TRADEMARK OFFICE
CERTIFICATE OF CORRECTION

PATENT No. : 5,631,542

DATED : May 20, 1997

INVENTOR(S): Guenter Lohr, Peter Wolff, Alexander Osswald

It is certified that error appears in the above-identified patent and that said Letters Patent is hereby corrected as shown below:

Column 7, line 50, " û " should be -- Û --;

Column 9, line 19, "B" should be --5--; and

Column 9, line 24 "z" should be --∅--.

Signed and Sealed this

Twenty-seventh Day of July, 1999

*Attest:*

Q. TODD DICKINSON

*Attesting Officer*      *Acting Commissioner of Patents and Trademarks*